(12) United States Patent
Nakaishi

(10) Patent No.: US 6,757,251 B1
(45) Date of Patent: Jun. 29, 2004

(54) OPTICAL LINE TERMINATION, PASSIVE OPTICAL NETWORK SYSTEM AND METHOD OF DYNAMICALLY CONTROLLING AN UPSTREAM BAND

(75) Inventor: Hiroshi Nakaishi, Tokyo (JP)

(73) Assignee: NEC Corporation (JP)

( * ) Notice: Subject to any disclaimer, the term of this patent is extended or adjusted under 35 U.S.C. 154(b) by 690 days.

(21) Appl. No.: 09/595,638

(22) Filed: Jun. 16, 2000

(30) Foreign Application Priority Data

Jun. 17, 1999 (JP) ............................................. 11/171240

(51) Int. Cl.[7] .......................... G01R 31/08; H04L 12/28; H04J 3/22; H04T 7/212
(52) U.S. Cl. .............................. 370/236.2; 370/395.43; 370/442; 370/468
(58) Field of Search ........................ 370/395.1, 395.43, 370/442, 468, 236.2; 398/98, 168; 725/138, 105

(56) References Cited

U.S. PATENT DOCUMENTS

| | | | | |
|---|---|---|---|---|
| 6,023,467 A | * | 2/2000 | Abdelhamid et al. | ........ 370/395 |
| 6,229,788 B1 | * | 5/2001 | Graves et al. | ............... 370/230 |
| 6,546,014 B1 | * | 4/2003 | Kramer et al. | ......... 370/395.41 |
| 6,633,541 B1 | * | 10/2003 | Hijikata et al. | ............. 370/231 |

FOREIGN PATENT DOCUMENTS

| | | |
|---|---|---|
| JP | 10-336186 | 12/1998 |
| JP | 10-336188 | 12/1998 |
| JP | 11-122279 | 4/1999 |
| JP | 11-146000 | 5/1999 |
| JP | 11-252035 | 9/1999 |
| JP | 11-266277 | 9/1999 |

OTHER PUBLICATIONS

"Broadband Optical Access Systems Based on Passive Optical Networks (PON)", *International Telecommunication Union, Telecommunication Standardization Sector*, Oct. 1998, Study Group 15, Recommendation G.983.1, pp. 1–131.

* cited by examiner

*Primary Examiner*—Duc Ho
(74) *Attorney, Agent, or Firm*—Dickstein, Shapiro, Morin & Oshinsky, LLP.

(57) ABSTRACT

An optical line termination (OLT) comprises a dynamic cell allocation section, a control section, a message transmitter-receiver section and a cell allocation section. The dynamic cell allocation section sets upstream bands based on existence of an alarm and a type thereof transmitted by each optical network termination(ONT). The alarm from each ONT is detected, and a detection result detected this time, a detection result detected for the last time and the number of empty cells in the cell allocation cycle are referred to. Thus, a new band is set for each ONT. The dynamic cell allocation section computes a cell allocation for a frame with respect to three types of upstream bands for each ONT. When the band is changed, cell allocation positions corresponding to all ONTs are computed.

32 Claims, 6 Drawing Sheets

| CASE NO. | RESULT DETECTED FOR THE LAST TIME | RESULT DETECTED THIS TIME | BAND SETTING INSTRUCTION |
|---|---|---|---|
| 1 | EMPTY ALARM | NO ALARM | ACR |
| 2 | NO ALARM | THRESHOLD EXCEEDING ALARM | PCR |
| 3 | NO ALARM | EMPTY ALARM | MCR |
| 4 | EMPTY ALARM | EMPTY ALARM | MCR |
| 5 | NO ALARM | NO ALARM | ACR |
| 6 | THRESHOLD EXCEEDING ALARM | THRESHOLD EXCEEDING ALARM | PCR |

FIG. 4

| CASE NO. | RESULT DETECTED FOR THE LAST TIME | RESULT DETECTED THIS TIME | RESULT DETECTED NEXT TIME | BAND SETTING INSTRUCTION |
|---|---|---|---|---|
| 7 | THRESHOLD EXCEEDING ALARM | NO ALARM | NO ALARM | ACR |
| 8 | THRESHOLD EXCEEDING ALARM | EMPTY ALARM | NO ALARM | ACR |

FIG. 5

OPTICAL LINE TERMINATION, PASSIVE OPTICAL NETWORK SYSTEM AND METHOD OF DYNAMICALLY CONTROLLING AN UPSTREAM BAND

BACKGROUND OF THE INVENTION

1. Field of the Invention

The present invention relates to an optical line termination, a passive optical network system and a method of dynamically controlling an upstream band.

2. Description of the Related Prior Art

A conventional passive optical network (hereinafter referred to as a PON) system comprises an optical line termination (OLT), a plurality of optical network terminations (ONTs) and a star coupler for coupling the OLT and the ONTs. For communications between the OLT and the ONTs, an asynchronous transfer mode (ATM) is used. For downstream communications from the OLT to the ONTs, a time division multiplex (TDM) communication is utilized. All ATM cells to be a transmitted to the ONTs are sent out to the ONTs. Each ONT selects an ATM cell transmitted to itself, and ignores other ATM cells. For upstream communications from the ONTs to the OLT, a time division multiple access (TDMA) communication is utilized. A cell transmitted from each ONT is allocated fixedly and previously in a frame of a TDMA format by an instruction from a network management system (NMS) on the OLT side. In other words, it is impossible to dynamically control the upstream band of ATM-PON. ITU-T recommendation G.983.1 (BROADBAND OPTICAL ACCESS SYSTEMS BASED ON PASSIVE OPTICAL NETWORKS (PON), October 1998) touches on an operation and maintenance (OAM) cell which performs a band change request, in order to dynamically perform a upstream cell allocation. However, this recommendation does not show a control method concretely.

SUMMARY OF THE INVENTION

The object of the present invention is to provide a system and an OLT, which are capable of dynamically changing an upstream band in ATM-PON.

The OLT of the present invention comprises a dynamic cell allocation section and a control section. The dynamic cell allocation section sets an upstream band based on existence of an alarm and a type of the alarm which are transmitted by each ONT. The control section controls the communication with the ONTs. The OLT is capable of comprising a message transmitter-receiver section and a cell allocation section for outputting a cell allocation signal. The dynamic cell allocation section is capable of comprising a circuit for detecting existence of an alarm and a type of the alarm, which are transmitted from the ONT, and for outputting a signal which sets an upstream band of the ONT based at least on the detection result of this time and the last detection result. The dynamic cell allocation section is capable of comprising a computing section for computing and holding a total optical network termination cell allocation in a cell allocation cycle based on an upstream cell rate, which is set for each ONT, and for outputting a computing result to the cell allocation section.

A PON system of the present invention comprises the ONTs and the above mentioned OLT. The ONT comprises a control section, a message transmitter-receiver section, a buffer section, and a buffer control section. The buffer section holds data to be transmitted to the OLT, and outputs a threshold exceeding alarm when a quantity of data is epual to a first threshold or more. The buffer section outputs an empty alarm when the quantity of data is equal to a second threshold smaller than the first threshold or less. The buffer control section transmits the alarm to the message transmitter-receiver section, and controls the buffer section.

A method of dynamically controlling an upstream band of the present invention comprises the steps of setting plural types of upstream bands for each ONT; computing a cell allocation corresponding to the bands for a frame, thus holding a computing result; detecting existence of an alarm and a type of the alarm, which are transmitted by each optical network termination; referring at least to a detection result of this time and the last detection result, thus setting an upstream band of the ONT based on conditions previously set; computing a cell allocation position for each of the ONT in accordance with a band specification; and transmitting the cell allocation position computed for each ONT to each ONT.

BRIEF DESCRIPTION OF THE DRAWINGS

The above and other objects, features and advantages of the present invention will become apparent from the following detailed description when taken with the accompanying drawings, in which;

FIG. 4 is a table showing operation conditions of the optical line termination (OLT) of the present invention;

FIG. 5 is a table showing operation conditions of the optical line termination (OLT) of the present invention;

DETAILED DESCRIPTION OF THE PREFERRED EMBODIMENTS

Figure 1:
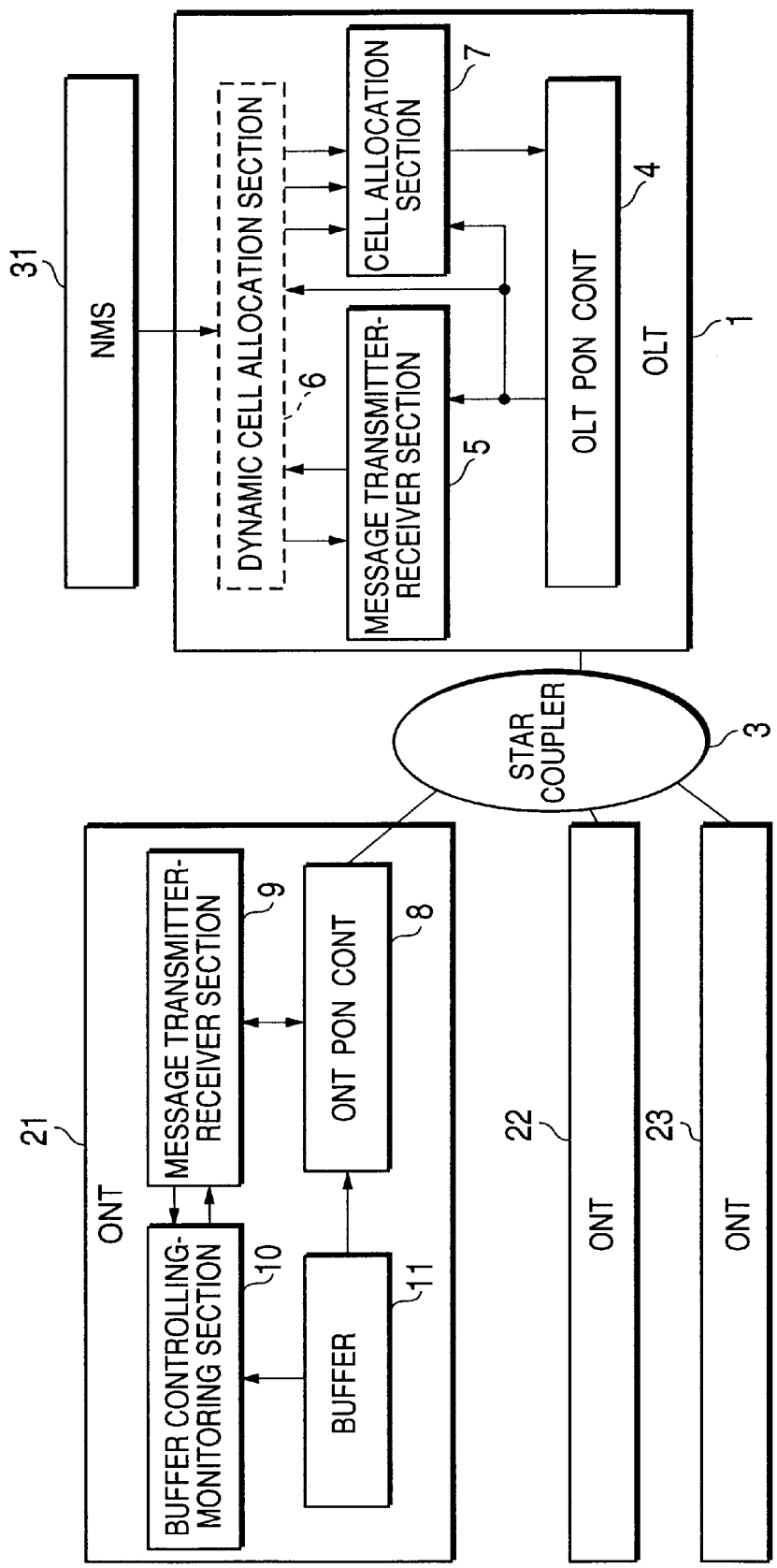
FIG. 1 is a block diagram showing a passive optical network(PON) system of the present invention.

Referring to FIG. 1, a PON system, to which the present invention is applied, comprises a plurality of ONTs 21, 22 and 23 set up on subscriber sides; one OLT 1; and a star coupler 3 for connecting these constituent components. The OLT 1 is connected to a network management system (NMS) 31. An upstream band setting parameter, for example, an upstream cell rate, is input from this NMS 31.

The OLT 1 comprises an OLT PON control section 4, a message transmitter-receiver section 5, a cell allocation section 7, and a dynamic cell allocation section 6. The OLT PON control section 4 controls communications between each ONT and the OLT 1. The message transmitter-receiver section 5 terminates the message from each ONT via the OLT PON control section 4, and transmits the message to each ONT. The message transmitter-receiver section 5 receives frame pulses transmitted by each ONT via the OLT PON control section 4. The dynamic cell allocation section 6 receives the message from the message transmitter-receiver section 5, and receives the frame pulses from the OLT PON control section 4. The dynamic cell allocation section 6 receives the number of cells in a cell allocation cycle corresponding to a band setting parameter of each ONT, for example, a cell rate, which is input to the NMS 31.

The dynamic cell allocation section 6 performs a computation based on the input data. As a result, the dynamic cell allocation section 6 outputs a computation completion signal, an allocation change position signal for indicating from which frame in the cell allocation cycle a cell allocation change should be performed, and data of the cell allocation relating to each ONT to the cell allocation section 7. Furthermore, the dynamic cell allocation section 6 outputs a buffer threshold control message to the message transmitter-receiver section 5. The cell allocation section 7 receives the data from the dynamic cell allocation section 6, and receives the frame pulses from the OLT PON control section 4, thus periodically outputting a cell allocation instruction to the OLT PON control section 4. The cell allocation instruction is transmitted to each ONT via the OLT PON control section 4. The OLT 1 is capable of comprising a computation section (not shown) for computing the number of cells in the cell allocation cycle based on the band setting parameter of each ONT, which is received from the network management system 31. Alternatively, the network management system 31 may comprise this computing section, and may output the number of cells in the cell allocation cycle to the OLT 1. The case where the band setting parameter of each ONT is input from the NMS 31 corresponds to an initial setting for the PON system and to a change of an upstream band of the ONT during an operation of the PON system.

The ONT comprises basically an ONT PON control section 8, a message transmitter-receiver section 9, a buffer controlling monitoring section 10 and a buffer 11. The ONT PON control section 8 performs communications between the ONT and the OLT 1. The message transmitter-receiver section 9 terminates the message from the OLT 1 via the ONT PON control section 8, and transmits the message to the OLT 1. The buffer controlling-monitoring section 10 receives a buffer control signal in a buffer threshold control message transmitted from the OLT 1, and changes the threshold of the buffer 11. Furthermore, the buffer controlling-monitoring section 10 outputs a threshold exceeding alarm transmitted by the buffer 11 and an empty alarm to the ONT message transmitter-receiver section 9. The buffer 11 receives an ATM cell which is transmitted to the OLT, and outputs it to the control section 8. The buffer 11 has a variable full threshold and a threshold indicating an empty state, and outputs the threshold exceeding alarm when a quantity of ATM cells to be transmitted is equal to the full threshold or more. The buffer 11 outputs the empty alarm when the quantity of ATM cells is equal to a threshold indicating an empty state or less. However, the following conditions can be adopted. Specifically, the buffer 11 may output the threshold exceeding alarm when a quantity of ATM cells exceeds the full threshold. The buffer 11 may output the empty alarm when the quantity of ATM cells is below a threshold indicating an empty state.

Figure 2:
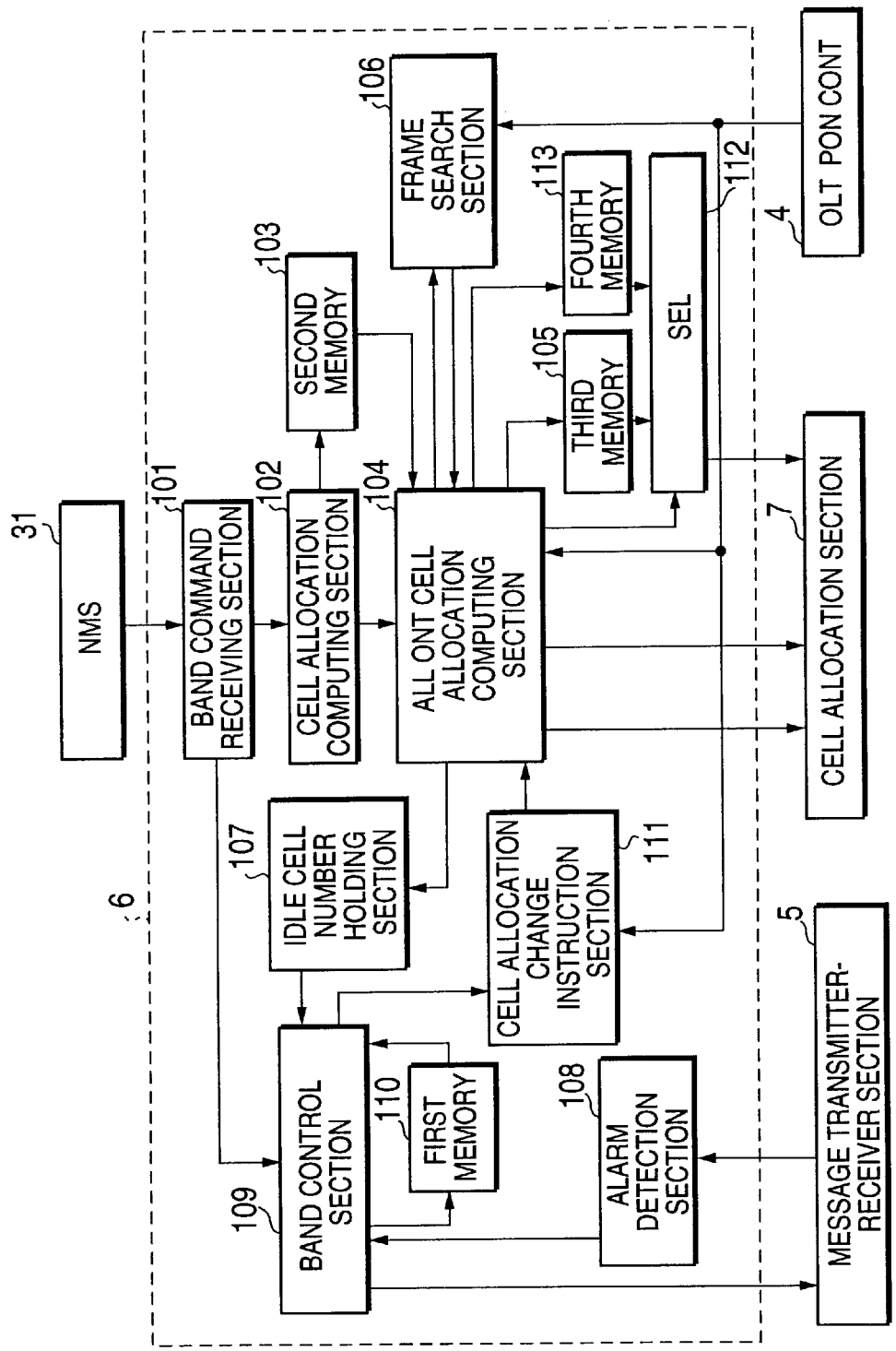
FIG. 2 is a block diagram showing an optical line termination(OLT) of the present invention.

FIG. 2 shows an example of the dynamic cell allocation section 6. The dynamic cell allocation section 6 comprises a section for computing a cell allocation and a section for controlling an upstream band of the ONT. The section for computing the cell allocation comprises mainly a cell allocation computing section 102, an all ONT cell allocation computing section 104, a second memory 103, a third memory 105 and a fourth memory 113. The section for controlling the upstream band of the ONT comprises mainly an idle cell number holding section 107, an alarm detection section 108, a band control section 109, a first memory 110, and a cell allocation change instruction section 111.

When as band setting parameters for each ONT a peak cell rate (PCR), an average cell rate (ACR) and a minimum cell rate (MCR) are input to the network management system 31, these data are transmitted to the computing section provided in the NMS 31 or the OLT 1. The computing section computes the number of cells in the cell allocation cycle corresponding to the PCR, the ACR and the MCR, and outputs the number of cells computed to a band command receiving section 101. The band command receiving section 101 outputs the number of cells to the cell allocation computing section 102, and outputs a band setting parameter change instruction signal to the band control section 109. The cell allocation computing section 102 computes a cell allocation for each frame pulse of the PCR, the ACR and the MCR, based on the number of cells in the cell allocation cycle corresponding to the PCR, the ACR and the MCR, and outputs the cell allocation to the second memory 103. The n frames constitute the cell allocation cycle, and a frame pulse to be transmitted by the ONT is arranged on a head of each frame. The second memory 103 stores the above described cell allocation for each ONT. The cell allocation computing section 102 outputs a computation completion signal to the all ONT cell allocation computing section 104 after completion of the computation. The all ONT cell allocation computing section 104 reads out the content of the second memory 103 based on a signal from the cell allocation change instruction section 111, and computes a cell allocation position to be allocated to each ONT. Each ONT writes the cell allocation position to the third and fourth memories 105 and 113. The cell allocation position means the order of a cell of each ONT arranged in the cell allocation cycle when each ONT is set to any of the PCR, the ACR and the MCR. The signal received from the cell allocation change instruction section 111 is a signal for instructing the change of the upstream cell rate for an assigned ONT. The all ONT cell allocation computing section 104 outputs to the cell allocation section 7 the computation completion signal and the allocation change position signal indicating from which frame in the cell allocation cycle the cell allocation change should be performed. A selector 112 connected to the third and fourth memories 105 and 113 is set up. The selector 112 receives a selection signal from the all ONT cell allocation computing section 104, and transmits data of any of the two memories 105 and 113 to the cell allocation section 7. The above described computing section 104 computes a sum total of the numbers of idle cells in the cell allocation cycle, and output the computation result to the idle cell number holding section 107. The dynamic cell allocation section 6 further comprises a frame search section 106. The frame search section 106 receives the frame pulses via the OLT PON control section 4, and receives the cell allocation cycle pulses from the all ONT cell allocation computing section 104. Thus, the frame search section 106 notifies the computing section 104 to which frame in the cell allocation cycle the frame that is being used corresponds. In the section for controlling the upstream band of the ONT in the dynamic cell allocation section 6, the idle cell number holding section 107 holds the sum total of the numbers of idle cells in the cell allocation cycle, and transmits it to the band control section 109. The alarm detection section 108 receives the message transmitted from each ONT via the message transmitter-receiver section 5. The alarm detection section 108 detects existence of the alarm in the message transmitted from each ONT, and when the alarm detection section 108 detects the alarm, the alarm detection section 108 decides whether the alarm is a threshold exceeding alarm or an empty alarm. The alarm detection section 108 sends out these results to the band control section 109. To the band control section 109, connected is the first memory 110 which holds the result received from the alarm detection section 108 for the last time. The band control section 109 supplies the result received this time to the first memory 110, and reads out the result received for the last time from the memory 110. The band control section 109 refers to at least the result received this time and the result for the last time, and further refers to the sum total of the numbers of idle cells in the cell allocation cycle if necessity. The band control section 109 determines an upstream band of each ONT based on predetermined conditions. The cell allocation change instruction section 111 notifies the all ONT cell allocation computing section 104 of an upstream band of each ONT, i.e., any of the PCR, the ACR and the MCR, determined by the band control section 109, in accordance with the frame pulses received from the OLT PON control section 4.

Figure 3:
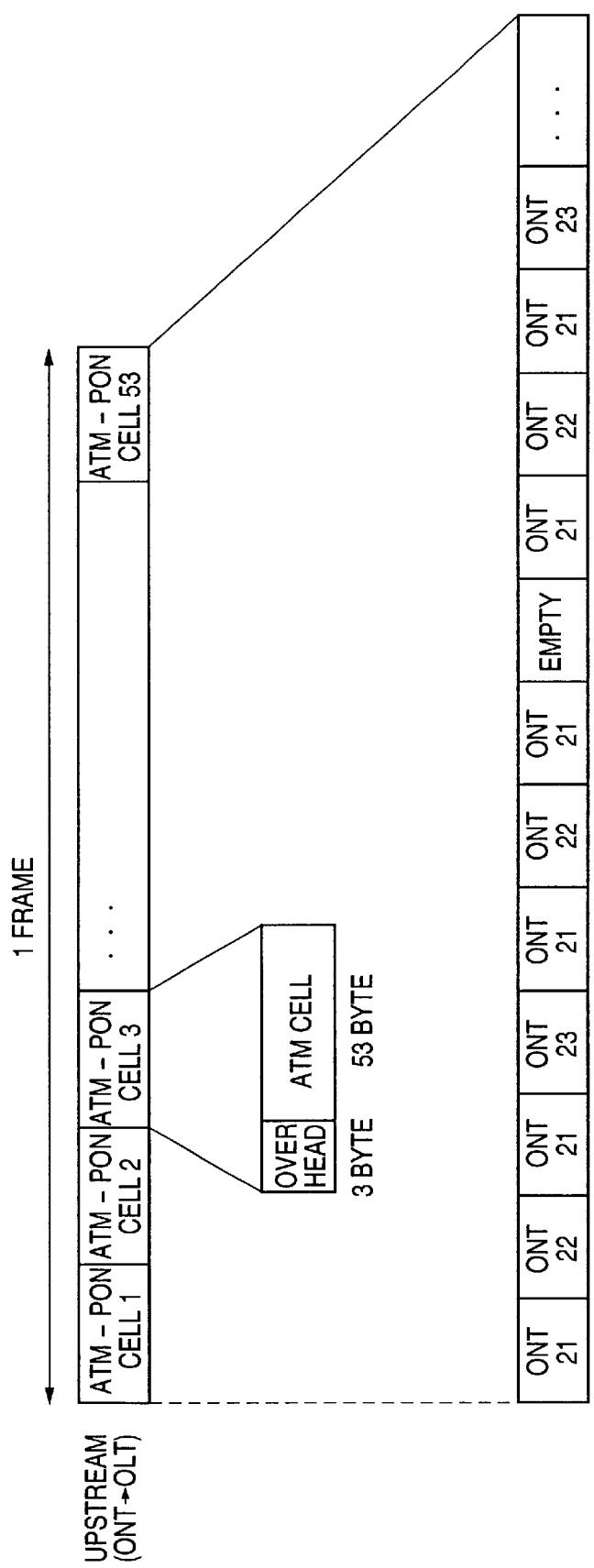
FIG. 3 is a diagram showing a structure of a frame of the present invention.

Next, operations of the PON system and the OLT will be described. FIG. 3 shows an example of a frame. 53 ATM-PON cells constitute one frame. One ATM-PON cell is constituted by 3-bytes over head and 53-bytes ATM cell. In the frame, cells of each ONT are arranged so as to be disposed at intervals as regular as possible. Idle cell may be arranged in the frame depending on communication conditions. In the present invention, n frames constitute the cell allocation cycle. Since a plurality of ONTs are provided in the ATM-PON system, transmission delays should be as equal as possible among the ONTs. For this reason, it is desirable to constitute the cell allocation cycle by connecting a plurality of TDMA frames in order to transmit data effectively. The buffer 11 of the ONT outputs the threshold exceeding alarm when the quantity of ATM cells received becomes equal to the full threshold or more, and outputs the empty alarm when the quantity of ATM cells becomes equal to the empty threshold or less. The alarm is mapped in a message area of a physical layer operations administration and maintenance (PLOAM) cell in the TDMA frame, and transmitted from the ONT.

Figure 6:
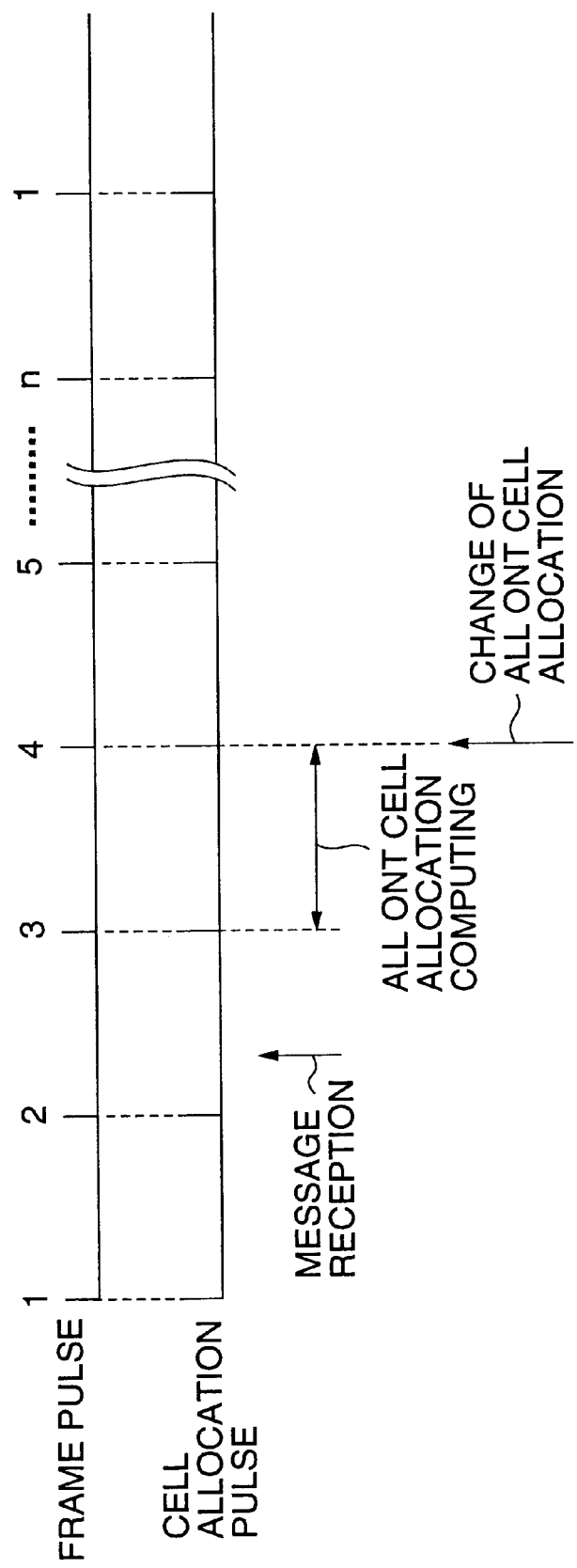
FIG. 6 is a chart showing an operation of the optical line termination(OLT) of the present invention.

The control section 4 of the OLT 1 receives the frame pulses indicating the frame, and transmits the frame pulses to the message transmitter-receiver section 5, the cell allocation section 7 and the dynamic cell allocation section 6. The message transmitter-receiver section 5 receives the message from the ONT at a position of the frame pulse, and transmits the message to the alarm detection section 108. The band control section 109 refers to the result detected this time and the result detected for the last time, thus determining an upstream band of each ONT. The determination of the band can be performed under the conditions of the Table shown in FIGS. 4 and 5, as an example. In the case where the alarm from the ONT corresponds to the cases No. 1 to No. 3 of the Table, the upstream bands of the ONT are decided to the ACR, the PCR and the MCR, respectively. Thereafter, with respect to an ONT requiring the band change, the band control section 109 transmits the change instruction of the band to any of the ACR, the PCR and the MCR to the cell allocation change instruction section 111. When the number of cells increases, the number of idle cells in the cell allocation cycle is referred to. When an increase in the cells is equal to the number of the idle cells or less, the above described band determination is performed. When the increase in the cells is larger than the number of the idle cells, the band of an assigned ONT is increased in accordance with a priority order previously established. Also when the increase in the cells is equal to the number of the idle cells, the band of the assigned ONT may be increased in accordance with the priority order. In the cases No. 4 to No. 6 of the Table shown in FIG. 4, the currently established conditions are maintained. At this time, the band control section 109 does not transmit a signal to the cell allocation change instruction section 111. In the cases No. 7 and No. 8 of the Table shown in FIG. 5, the band control section 109 outputs to the message transmitter-receiver section 5 a buffer threshold control signal for controlling the full threshold of an ONT in question so as to be changed to a corresponding value of the ACR or less. When the alarm detection section 108 does not detect the alarm from the ONT in the frame received immediately after that time, the band control section 109 transmits to the cell allocation change instruction section 111 a signal for setting the ONT to the ACR, and, at the same time, transmits to the message transmitter-receiver section 5 the buffer threshold control signal for controlling the full threshold of an ONT in question so as to restore the original value. When the all ONT cell allocation computing section 104 receives a signal to change the band of the ONT from the cell allocation change instruction section 111, the all ONT cell allocation computing section 104 reads out necessary data from the second memory 103, and computes a cell allocation position allocated to each ONT, thus writing it to the third memory 105 or the fourth memory 113. At this time, when the results already computed are stored in the third and fourth memories 105 and 114, the computation result is overwritten on a memory in which previous results are stored. As shown in FIG. 6, when the OLT receives a message from the ONT after the frame pulse 2, all ONT cell allocation computations are executed from the frame pulse 3. Thereafter, when the operation of the OLT proceeds to the frame pulse 4, the cell allocation positions of all changed ONT are input to any of the third and fourth memories 105 and 113. Under the conditions of the Table shown in FIG. 5, the above described all ONT cell allocation positions are input to the memory when the operation of the OLT proceeds to the frame pulse 5. The all ONT cell allocation computing section 104 outputs to the cell allocation section 7 a computation completion signal and an allocation change position signal indicating from which frame in the cell allocation cycle the cell allocation change should be performed. The cell allocation section 7 transmits to the ONT the allocation change position signal and the changed all ONT cell allocation transmitted from the third memory 105 or the fourth memory 113 at a predetermined timing. Each ONT transmits a cell using a new band from a next cell allocation cycle forward. When all ONT cell allocation positions are not newly computed, the data previously input is output from the third memory 105 or the fourth memory 113. Moreover, when an upstream band of the ONT is changed, data newly computed is output from the above-described memory.

When this system is initially set, data is input from the NMS 31, and, thereafter, the all ONT cell allocation computing section 104 computes the cell allocations of all ONTs while supposing that upstream bands of the ONTs are ACR. The all ONT cell allocation computing section 104 inputs the computation results to the third memory 105 or the fourth memory 113, and transmits each of the computed results to the corresponding ONT via the cell allocation section.

Figure 7:
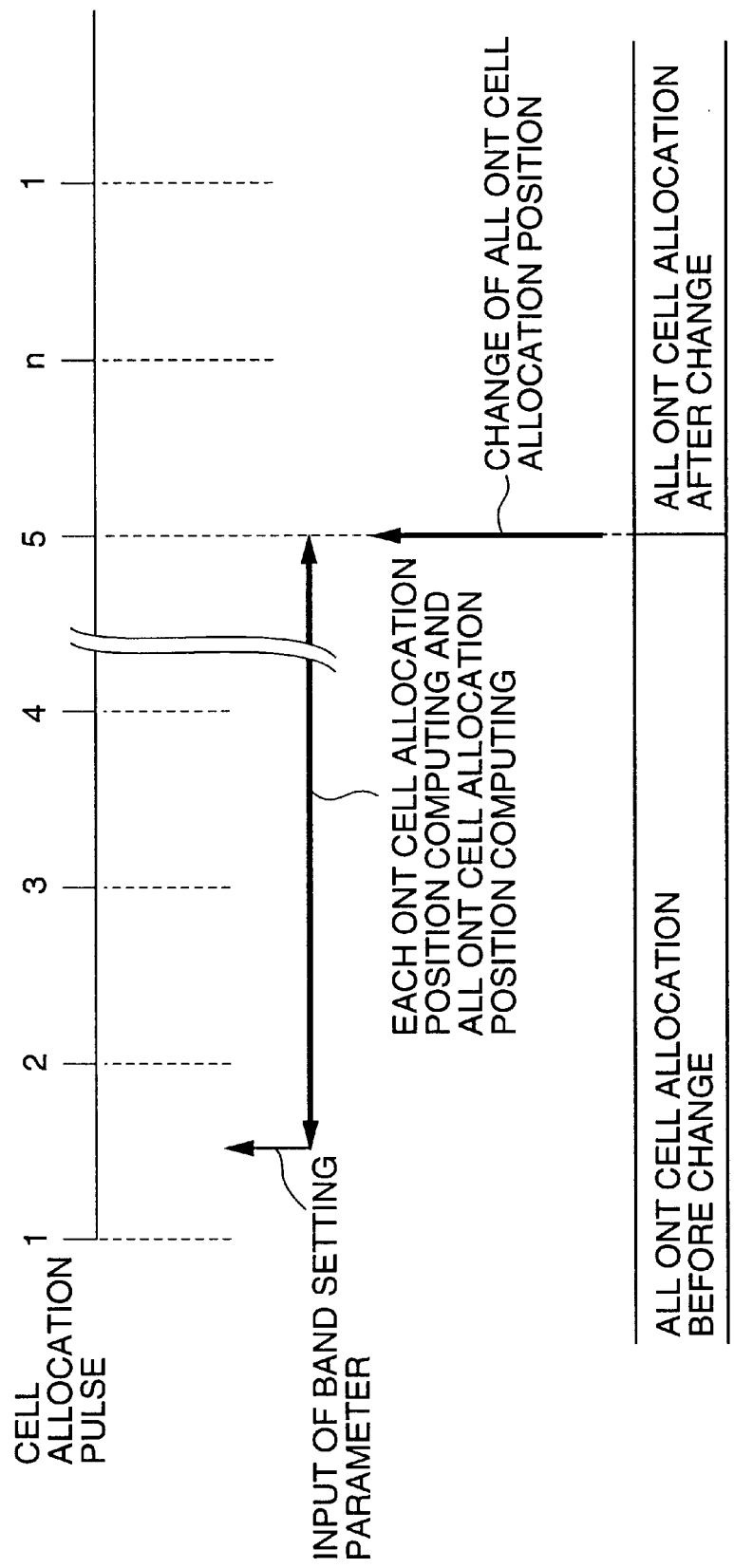
FIG. 7 is a chart showing an operation of the optical line termination(OLT) of the present invention.

Referring to FIG. 7, when a new band setting parameter is input thereto from the NMS 31 during an operation of this system, the band command receiving section 101 outputs the band setting parameter change instruction signal to a band control section 109. The band control section 109 stops its operation until computations for all ONT cell allocations based on conditions newly input are completed. In a cell allocation pulse immediately after the completion of the computation by the all ONT cell allocation computing section 104, the all ONT cell allocations which were newly computed are reflected on each ONT, and the band control section 109 resumes its operation.

The controlling conditions shown in FIGS. 4 and 5 are programmable. The band control section 109 can be operated under different conditions. The band control section 109 can operate based on only the results obtained this time and for the last time. The band of the ONT can be also determined based on receiving results which are obtained by the detection continuously performed three times, that is, the results obtained by the detection performed twice in the past and the result of this time.

In the above descriptions, though the full threshold of the buffer of the ONT is variable, the full threshold and the empty threshold may be set to be invariable, and other threshold may be set to be variable. A quantity of the ATM cells stored in the buffer of the ONT can be monitored.

In the present invention, since the OLT computes and holds the cell allocations corresponding to the PCR, the ACR and the MCR toward the upstream of the ONTs, it is possible to compute the cell allocations of all ONTs within one frame. Therefore, after the OLT receives the message including the alarm, the cell allocations of all ONTs can be changed within two or three frames. Moreover, since the band toward the upstream of the ONT can be dynamically changed, it is possible to utilize idle cells effectively.

While the present invention has been described in connection with certain preferred embodiments, it is to be understood that the subject matter encompassed by the present invention is not limited to those specific embodiments. On the contrary, it is intended to include all alternatives, modifications, and equivalents as can be included within the spirit and scope of the following claims.

What is claimed is:

1. An optical line termination(OLT) disposed in a passive optical network(PON) system having a plurality of optical network terminations(ONTs), comprising:
    a dynamic cell allocation section for setting an upstream band, based on existence of an alarm and a type thereof transmitted by each of the ONTs, wherein the dynamic cell allocation section includes a frame search section for notifying to the all ONT cell allocation computing section where a received frame stands among frames in the cell allocation cycle; and
    a control section for controlling a communication with each of the ONTs.

2. The optical line termination(OLT) according to claim 1, the OLT further comprising:
    a message transmitter-receiver section for transmitting a message to each of the ONTs and receiving a message from each of the ONTs; and
    a cell allocation section for outputting a cell allocation signal.

3. The optical line termination(OLT) according to claim 2, wherein the dynamic cell allocation section includes a computing section for computing and holding all ONT cell allocations in a cell allocation cycle based on upstream cell rates, and for outputting a computing result to the cell allocation section.

4. The optical line termination(OLT) according to claim 2, wherein the dynamic cell allocation section includes:
    a computing section for computing and holding all ONT cell allocations in a cell allocation cycle based on upstream cell rates, and for outputting a computing result to the cell allocation section; and
    a circuit for detecting the existence of the alarm and the type thereof transmitted by each of the ONTs, and outputting a signal to the computing section based on at least the detection result this time and a result detected for the last time, the signal assigning the upstream band of each ONT.

5. The optical line termination(OLT) according to claim 1, wherein the alarm from the ONT is any of a threshold exceeding alarm and an empty alarm, the threshold exceeding alarm indicating that a quantity of data to be transmitted is equal to a first threshold or more and the empty alarm indicating that the quantity of data is equal to a second threshold or less, which is smaller than the first threshold.

6. The optical line termination(OLT) according to claim 1, wherein the dynamic cell allocation section includes a circuit for detecting the existence of the alarm and the type thereof transmitted by each of the ONTs and for setting an upstream band of each of the ONTs based on at least a result detected this time and a result detected for the last time.

7. The optical line termination(OLT) according to claim 1, wherein the dynamic cell allocation section includes:
    an alarm detection section for detecting the existence of the alarm and the type thereof from the message transmitted by each of the ONTs;
    a first memory for holding a detection result detected by the alarm detection section; and
    a band control section for transmitting a signal which sets an upstream band of the ONT based on at least the result detected this time and the result detected for the last time stored in the first memory.

8. The optical line termination(OLT) according to claim 7, wherein the band control section transmits the result detected this time to the first memory, and the first memory stores the result detected this time.

9. The optical line termination(OLT) according to claim 7, wherein the band control section further refers to the number of idle cells in a cell allocation cycle and transmits the signal which sets the upstream band of each of the ONTs.

10. The optical line termination(OLT) according to claim 7, wherein the signal is a signal for changing the number of upstream cells, which is transmitted from the predetermined ONT.

11. The optical line termination (OLT) according to claim 1, wherein one band is selected among a plurality of bands previously set for each of the ONTs.

12. The optical line termination(OLT) according to claim 1,
    the OLT further comprising:
        computing means for obtaining the corresponding number of cells in the cell allocation cycle, based on plural types of upstream cell rates set to the ONTs.

13. The optical line termination (OLT) according to claim 12, wherein the plural types of cell rates are a peak cell rate (PCR), an average cell rate (ACR) and a minimum cell rate (MCR).

14. The optical line termination(OLT) according to claim 1,
    wherein the dynamic cell allocation section includes:
        a cell allocation computing section for computing a cell allocation corresponding to each of plural types of upstream cell rates for each frame;
        a second memory for storing each cell allocation output from the cell allocation computing section;
        an all ONT cell allocation computing section for reading out the cell allocations of a predetermined band from the second memory and computing cell allocation positions for all ONTs; and the third and fourth memories for alternately storing results output from the all ONT cell allocation computing section.

15. The optical line termination(OLT) according to claim 14,
wherein the all ONT cell allocation computing section transmits an allocation change position signal indicating a frame which changes the cell allocation; and transmits a selection control signal for allowing one of the third and fourth memories to output data.

16. The optical line termination(OLT) according to claim 1,
wherein the dynamic cell allocation section includes:
a cell allocation computing section for computing each of cell allocations for a frame, the cell allocation corresponding to each of plural types of upstream cell rates, which is set for each optical network termination;
a second memory for storing each of the cell allocations output from the cell allocation computing section;
an all optical network termination cell allocation computing section for reading out the cell allocations of a predetermined band from the second memory and computing cell allocation positions for all ONTs;
third and fourth memories for alternately storing results output from the all ONT cell allocation computing section;
an alarm detection section for detecting the existence of the alarm and the type thereof from a message transmitted by each of the ONTs;
a first memory for storing a detection result detected by the alarm detection section; and
a band control section for transmitting a signal which sets the upstream band of each ONT based on at least the result detected this time and a result detected for the last time stored in the first memory; and
wherein the all optical network termination cell allocation computing section obtains the number of idle cells in a cell allocation cycle, and the band control section transmits a signal for assigning the upstream band.

17. The optical line termination(OLT) according to claim 16,
wherein the number of idle cells in the cell allocation cycle is held in an idle cell number holding section, and then transmitted to the band control section; and
the signal for setting the upstream band is transmitted to the all ONT cell allocation computing section via a cell allocation instruction section.

18. The optical line termination(OLT) according to claim 1,
wherein the OLT is connected to a network management system (NMS) to which plural types of upstream cell rates, which are assigned for each of the ONTs, are input.

19. The optical line termination(OLT) according to claim 18,
wherein the NMS comprises computing means for obtaining the corresponding number of cells in a cell allocation cycle, based on the plural types of upstream cell rates set for each of the ONTs.

20. A passive optical network(PON) system in which an optical line termination(OLT) and a plurality of optical network terminations(ONTs) are connected by a coupler, the OLT comprising:
a dynamic cell allocation section for transmitting a signal which sets an upstream band from each ONT to the OLT, based on existence of an alarm and a type thereof transmitted by each ONT;
a control section for controlling communications with each ONT;
a message transmitter-receiver section for transmitting a message to each ONT and receiving a message from each ONT; and
a cell allocation section for outputting a cell allocation signal, and
each ONT comprising:
a control section for controlling communication with the OLT;
a message transmitter-receiver section for transmitting a message to the OLT and receiving a message from the OLT;
a buffer section for holding data to be transmitted to the OLT, outputting a threshold exceeding alarm when a quantity of the data is equal to a first threshold or more, and outputting an empty alarm when the quantity of the data is equal to a second threshold or less, which is smaller than the first threshold; and
a buffer control section for transmitting the alarm to the message transmitter-receiver section and controlling the buffer section.

21. The PON system according to claim 20, wherein the OLT is connected to a network management system (NMS) to which plural types of upstream cell rates, which are assigned for each of the ONTs, are input.

22. The PON system according to claim 20, wherein the first and second thresholds of the buffer section are variable.

23. A method of dynamically controlling an upstream band in a passive optical network(PON) system in which an optical line termination(OLT) and a plurality of optical network terminations (ONTs) are connected by a coupler, comprising the steps of:
setting plural types of upstream bands for the ONTs;
computing cell allocations for a frame, the cell allocations corresponding to values of the bands, and holding the computation results;
detecting existence of an alarm and a type thereof transmitted by each ONT, referring to at least a detection result detected this time and a detection result detected for the last time, and setting upstream bands of the ONTs based on previously set conditions;
computing cell allocation positions for all ONTs in accordance with the settings; and
transmitting the cell allocation positions for all ONTs.

24. The method according to claim 23, wherein the number of cells in a cell allocation cycle corresponding to values of cell rates set is obtained.

25. The method according to claim 23, wherein the cell allocation positions for all of the optical network terminations, which were computed this time, and the cell allocation positions computed for the last time are stored in different memories, and any of the cell allocation positions is selectively output.

26. The method according to claim 23, wherein the cell allocation positions for all of the ONTs are computed based on the held cell allocations for the frame.

27. The method according to claim 23, wherein when the upstream band of the ONTs are set, the number of empty cells in the cell allocation cycle is further referred to.

28. The method according to claim 23, wherein existence of an alarm and a type thereof transmitted by each ONT are detected, and the detection results detected continuously three times, which includes the one detected this time, are referred to, and the upstream bands of the ONTs are set based on previously set conditions.

29. The method according to claims 23, wherein the cell allocation positions for all of the ONTs are executed from a next cell allocation cycle.

30. The method according to claim 23, wherein the plural types of upstream bands are a peak cell rate (PCR), an average cell rate (ACR) and a minimum cell rate (MCR).

31. The method according to claim 23, wherein when the PON system starts to operate, the cell allocation positions for all of the ONTs are computed assuming that the upstream cell rates of all ONTs are the ACR.

32. The method according to claim 23, wherein when the upstream bands of the ONTs are input during an operation of the PON system, an operation for setting the upstream bands of the ONTs is stopped until computations of the cell allocation positions for all ONTs are completed.

* * * * *